(12) United States Patent
Bellier et al.

(10) Patent No.: US 7,969,936 B2
(45) Date of Patent: Jun. 28, 2011

(54) RADIO TERMINAL, MODULE FOR SUCH A UNIT AND METHOD FOR TRANSMITTING ASSOCIATED CONTROL CHANNELS

(75) Inventors: Thierry Bellier, Copenhagen (DK); Benoist Sebire, Espoo (FI); Harri Jokinen, Hiisi (FI)

(73) Assignee: Nokia Siemens Networks Oy, Espoo (FI)

( * ) Notice: Subject to any disclaimer, the term of this patent is extended or adjusted under 35 U.S.C. 154(b) by 1409 days.

(21) Appl. No.: 10/250,820

(22) PCT Filed: Jan. 9, 2001

(86) PCT No.: PCT/EP01/00159
§ 371 (c)(1),
(2), (4) Date: Dec. 23, 2003

(87) PCT Pub. No.: WO02/056609
PCT Pub. Date: Jul. 18, 2002

(65) Prior Publication Data
US 2004/0095953 A1 May 20, 2004

(51) Int. Cl.
*H04W 4/00* (2009.01)
(52) U.S. Cl. .................. 370/329; 370/328; 370/522
(58) Field of Classification Search .................. None
See application file for complete search history.

(56) References Cited

U.S. PATENT DOCUMENTS

| | | | |
|---|---|---|---|
| 5,182,753 A | 1/1993 | Dahlin et al. | |
| 5,627,880 A | 5/1997 | Rozanski et al. | |
| 5,826,173 A * | 10/1998 | Dent | 340/7.38 |
| 5,940,380 A * | 8/1999 | Poon et al. | 370/330 |
| 6,011,786 A * | 1/2000 | Dent | 370/330 |
| 2001/0030949 A1* | 10/2001 | Molno et al. | 370/329 |

FOREIGN PATENT DOCUMENTS

| | | |
|---|---|---|
| EP | 0 471 656 | 2/1992 |
| WO | WO 95/08896 | 3/1995 |
| WO | WO 95/31879 | 11/1995 |
| WO | WO 00/51363 | 8/2000 |

OTHER PUBLICATIONS

GSM 3GPP (3rd Generation Partnership Project) TS (Technical Specification) 03.64 V (version) 8.10.0 (Feb. 2002), "*GPRS; Overall Description of the GPRS Radio Interface; Stage 2*," Release 1999, 57pp.

(Continued)

*Primary Examiner* — Michael J Moore, Jr.
(74) *Attorney, Agent, or Firm* — Ware, Freesola, Van Der Sluys & Adolphson LLP

(57) ABSTRACT

The invention relates to a method for improving the quality of control signalling based on signalling messages controlling speech or data transmission over an air interface between at least two radio terminals of a radio communications system, said speech or data being transmitted in at least one traffic channel of said radio communications system, and said signalling messages being transmitted in control channels associated with said at least one traffic channel. In order to allow for an improved performance of SACCH and FACCH, a first and a second signalling message with identical content are transmitted in two separate associated control channels. Alternatively, a signalling message included in a single ACCH is coded with a stronger coding. The invention relates equally to corresponding radio terminals and modules for such units.

37 Claims, 4 Drawing Sheets

OTHER PUBLICATIONS

GSM 3GPP TS 05.10 V7.4.0 (Nov. 2000), "*Radio Subsystem Synchronization,*" Release 1998, 22pp.

GSM 3GPP TS 05.08 V7.7.0 (Aug. 2001), "*Digital Cellular Telecommunications System (Phase 2+); Radio Subsystem Link Control,*" Release 1998, 69pp.

GSM ETSI EN 300 909, 05.03 V6.2.1 (Aug. 1999), "*Digital Cellular Telecommunications System (Phase 2+); Channel Coding,*" Release 1997, 46pp.

GSM 3GPP TS 04.60 V7.9.0 (Apr. 2001), "*GPRS; Mobile Station (MS)—Base Station System (BSS) Interface; Radio Link Control/Medium Access Control (RLC/MAC) Protocol,*" Release 1998, 215pp.

GSM 3GPP TS 04.18 V8.9.0 (Apr. 2001), "*Mobile Radio Interface Layer 3 Specification, Radio Resource Control Protocol,*" Release 1999, 320pp.

* cited by examiner

RADIO TERMINAL, MODULE FOR SUCH A UNIT AND METHOD FOR TRANSMITTING ASSOCIATED CONTROL CHANNELS

CROSS REFERENCE TO RELATED APPLICATIONS

This application is for entry into the U.S. national phase under §371 for International Application No. PCT/EP01/00159 having an international filing date of Jan. 9, 2001, and from which priority is claimed under all applicable sections of Title 35 of the United States Code including, but not limited to, Sections 120, 363 and 365(c).

FIELD OF THE INVENTION

The invention relates to a method for improving the quality of control signalling based on signalling messages controlling speech or data transmission over an air interface between at least two radio terminals of a radio communications system, said speech or data being transmitted in at least one traffic channel of said radio communications system, and said signalling messages being transmitted in control channels associated with said at least one traffic channel. The invention equally relates to such radio terminals and modules for radio terminals.

BACKGROUND OF THE INVENTION

In radio communications systems, speech or other user data is transmitted between radio terminals, in particular between a base station of a network and a mobile station, by using Traffic Channels TCH. In order to enable an efficient voice transmission, several aspects related to the transmission, like the allocation of radio resources and handovers, have to be managed in co-operation between the network and respective mobile stations. For such a management, signalling messages must be conveyed over the air interface in addition to user data between the network and a mobile station in both direction. The signalling messages can be transmitted independently, as long as no user data is transmitted.

When traffic is ongoing, the signalling messages are transmitted in Associated Control Channels ACCH.

It is known from the state of the art to use two different kinds of ACCHs, Slow Associated Control Channels (SACCH) and Fast Associated Control Channels (FACCH). FACCHs enable a faster transmission of signalling messages than SACCHs. SACCHs are therefore used for non-urgent procedures, mainly for the transmission of the radio measurement data needed for handover decisions. FACCHs (or main DCCHs) are involved in delay sensitive mechanisms such as handover. The use of SACCHs and FACCHs is described in more detail e.g. in "GSM 03.64: Digital cellular telecommunications system (Phase 2+), Overall description of the GPRS radio interface; Stage 2", "GSM 04.18: Digital cellular telecommunications system (Phase 2+), Mobile radio interface layer 3 specification, Radio Resource Control Protocol", "GSM 04.60: Digital cellular telecommunications system (Phase 2+), General Packet Radio Service (GPRS); Mobile Station (MS)—Base Station System (BSS) interface; Radio Link Control/Medium Access Control (RLC/MAC) protocol", "GSM 05.08: Digital cellular telecommunications system (Phase 2+), Radio Subsystem Link Control" or "GSM 05.10: Digital cellular telecommunications system (Phase 2+), Radio Subsystem Synchronization".

Currently, speech is transmitted on Traffic Channels using only GMSK (Gaussian-filtered Minimum-Shift Keying) modulation. In GERAN (GSM/EDGE RAN; GSM: Global System for Mobile communication, EDGE: Enhanced Data rates for GSM Evolution, RAN: Radio Access Network), speech will also be transmitted using 8PSK (Phase Shift Keying) modulation. Therefore, FACCHs will be either GMSK modulated if the co-transmitted speech is GMSK modulated and 8PSK modulated if the co-transmitted speech is 8PSK modulated. SACCH/TF (Slow, TCH/Full rate-Associated Control Channels) will be GMSK modulated for both, 8PSK and GMSK modulated speech, in full rate and half rate transmission mode.

Originally, SACCH and FACCH were designed for Full Rate speech Traffic Channels (TCH/FR) and later on for Enhanced Full Rate speech Traffic Channels (TCH/EFR) used in GSM. When the Adaptive Multi Rate (AMR) speech codecs were introduced for GSM in "GSM 05.03: Digital cellular telecommunications system (Phase 2+), Channel Coding", the same ACCHs were re-used.

The different AMR speech codecs aim at adapting the coding scheme to the link level quality. In a bad environment, a low speech codec with a low coding rate will be used, whereas in a good environment, a higher speech codec can be used with a higher coding rate. AMR thereby allows worse channel conditions for user data transmission as compared to traditional TCH/FR and TCH/EFR. As mentioned above, the channel coding of the ACCHs, however, was not adapted accordingly. As a consequence, while AMR allows data transmission under worse conditions, the block error rate of the ACCHs increases under such conditions. Therefore, more retransmissions are needed for the ACCHs and the transmission delay is increased, reducing the overall system performance.

SUMMARY OF THE INVENTION

It is an object of the invention to provide methods, radio terminals and modules for such radio terminals which allow for an improved control signalling based on signalling messages controlling speech or data transmission over an air interface during user data transmission between two radio terminals of a radio communications system. It is moreover an object of the invention to provide a 26-multiframe which allows for an improved control signalling.

This object is reached on the one hand with a method for improving the quality of control signalling based on signalling messages controlling speech or data transmission over an air interface between at least two radio terminals of a radio communications system, said speech or data being transmitted in at least one traffic channel of said radio communications system, and said signalling messages being transmitted in control channels associated with said at least one traffic channel, wherein a first and a second signalling message with identical content are transmitted in two separate associated control channels.

On the other hand, the object is reached with a radio terminal for a radio communications system and with a module for such a radio terminal, either including for improving the quality of control signalling based on signalling messages controlling speech or data transmission over an air interface to at least one other radio terminal of the radio communications system, said speech or data being transmitted in at least one traffic channel of said radio communications system, and said signalling messages being transmitted in control channels associated with said at least one traffic channel, means for inserting signalling messages with identical content into two different associated control channels.

The object is moreover reached with a corresponding radio terminal for a radio communications system, including for improving the quality of control signalling based on signalling messages controlling speech or data transmission over an air interface from at least one other radio terminal of the radio communications system, said speech or data being transmitted in at least one traffic channel of said radio communications system, and said signalling messages being transmitted in control channels associated with said at least one traffic channel, means for receiving two different associated control channels with signalling messages with identical content and means for evaluating said signalling messages. A corresponding module for such a radio terminal also comprises means for evaluating two received signalling messages with identical contents.

The invention proceeds from the idea that the performance of the signalling can be improved by increasing the coding of the signalling messages. The invention therefore proposes to transmit the same message twice, thereby improving the link performance of the control channels. Increasing the coding implies more coded data which needs to be transmitted. The second signalling message can be transmitted in particular at a position that has not been used until now or that does not significantly affect the speech quality. With the method and the radio terminal of the invention, the performance of the transmission of signalling messages in control channels can be increased, since a radio terminal receiving the two signalling messages with identical content can evaluate more redundant information.

The object of the invention is equally reached with a method for improving the quality of control signalling based on signalling messages controlling speech or data transmission over an air interface between at least two radio terminals of a radio communications system, said speech or data being transmitted in coded form in at least one traffic channel of said radio communications system, and said signalling messages being transmitted in coded form in at least one control channel associated with said at least one traffic channel, wherein said signalling messages are coded for transmission with a coding rate depending on the coding rate used for coding of said data or speech.

A corresponding radio terminal for a radio communications system, including for improving the quality of control signalling based on signalling messages controlling speech or data transmission over an air interface to at least one other radio terminal of the radio communications system, said speech or data being transmitted in coded form in at least one traffic channel of said radio communications system, and said signalling messages being transmitted in coded form in at least one control channel associated with said at least one traffic channel, means for coding said signalling messages with a coding rate depending on the coding rate used for coding said user data or speech. A corresponding module for such a radio terminal also includes means for coding a signalling message with a coding rate depending on the coding rate used for coding user data or speech that is to be transmitted.

Since it is proposed that the coding rate used for the signalling messages is adapted to the coding rate used for the user data, the coding of the signalling messages can be changed with the quality of the transmission path if the coding of the user data is. This means, if the coding rate used for coding speech or data to be transmitted is decreased, the coding rate for coding the signalling messages is decreased as well. Therefore, also this method and radio terminal are suited to improve the signalling performance. The first method and radio terminal of the invention, however, have the advantage that the receiving radio terminal can always try to decode the signalling message from the first control channel sent without waiting for the second control channel, which does not introduce a delay, while in the second method and radio terminal the coded signalling message has to be received completely before decoding is possible.

The radio terminals of the invention can be in particular base stations of a radio communications network and mobile stations suited to communicate with such a network.

Preferred embodiments of the invention become apparent from the subclaims.

The two signalling messages with identical content can be coded differently or identically for the two control channels. If both are coded identically, there is no need for an extra signalling to indicate that a different coding is used.

The evaluation of received signalling messages in the receiving radio terminal can be carried out in particular by soft combining of the two messages. Such a soft combining may be proceeded, however, by an attempt to decode at least the first signalling message separately.

If a separate decoding of the first or possibly of the second signalling message was successful, a soft combining is not necessary.

The methods, the radio transmission and receiving units and the modules according to the invention can be employed for an improved transmission of any kind of control channels associated to at least one traffic channel. In particular, it can be employed in a TDMA (Time Division Multiple Access) radio communications system for improving the transmission only of SACCHs or only of FACCHs or for an improved transmission of both. Performance problems arise mainly with SACCHs, but FACCHs appear to be problematic as well on full rate channels, when the lowest AMR modes are used.

In GSM/EDGE systems, 26-multiframes including 26 TDMA frames are used for carrying TCHs for speech and SACCH/Ts and FACCHs for signalling. Among the frames of each 26-multiframe, one is not used to transmit or receive. This frame composed of idle slots will be referred to in the following as the "idle frame". It gives a mobile station used as a receiving or transmitting radio terminal enough time to perform a pre-synchronisation based on received signalling channel (SCH) bursts of cells neighbouring the cell to which a base station belongs, which base station constitutes a second radio terminal with which a connection for data transmission is established. Once the mobile station has finished the pre-synchronisation with all neighbouring cells, i.e. when no other tasks are necessary during the idle frame, the idle slot corresponding to the timeslot used for the at least one traffic channel to which the control channels are associated can be used to convey additional signalling. In a preferred embodiment of the invention, this idle slot is used for transmitting the second signalling message in a "parallel" control channel, which improves the link level performance of control channels. This is suited in particular for SACCH transmissions.

More specifically, each SACHH message is encoded into four bursts, and each burst is transmitted as a part of a signalling message in a 26-multiframe. Therefore, four 26-multiframes are needed to send a complete SACCH message. In each multiframe, the first 12 frames and the $14^{th}$ to $25^{th}$ frames are used for carrying TCHs. In addition, depending on the subchannel used, either the respective $13^{th}$ frame or the respective $26^{th}$ frame is used for carrying one of the bursts of a SACCH signalling message. It is proposed to use the respective other frame, used in the state of the art as idle frame, for carrying a corresponding burst of a second SACCH signalling message with identical contents as the first SACCH signalling message. If the $13^{th}$ frame is used for the first SACCH, the 26th frame of the same multiframe is used for the second SACCH. If the 26th frame is used for the first SACCH, the 13th frame of the following multiframe is used for the second SACCH. Beginning with frame 0 as first frame in the first 26-multiframe used for a SACCH message, this would be frames 12, 38, 64 and 90 for the bursts of a first signalling message and frames 25, 51, 77 and 103 for the bursts of a second signalling message; alternatively frames 25, 51, 77 and 103 are used for the bursts of the first signalling message and frames 38, 64, 90 and 116 for the bursts of the second signalling message. Such a 26-multiframe also reaches the object of the invention, since it enables the transmission of two signalling messages with identical content and thereby an increase of the coding.

The last burst of the second signalling message in the parallel SACCH carried on frame 103 or 116 may not be read because of delay constraint of the SACCH of which the cycle is 480 ms.

Either the parallel SACCH uses a new coding, or each burst of the first signalling message is simply used again as corresponding burst of the parallel SACCH with the second signalling message.

If the idle slot is used for a second SACCH, the second transmitted signalling message can be employed in different ways.

In the downlink, an involved base station constituting a first, transmitting radio terminal preferably always sends a parallel SACCH on the idle frame. A mobile station constituting a second, receiving radio terminal, can then use this parallel SACCH in addition to the existing SACCH whenever no pre-synchronisation is needed, i.e. when no other tasks are necessary during the frames with the second signalling message. Alternatively, the network can indicate via the base station that the mobile station may defer pre-synchronisation operations if the SACCH performance needs to be improved. As a result, the mobile station uses the "parallel" SACCH also during pre-synchronisation if necessary. In a further possibility, the mobile station is generally allowed to defer neighbour cell synchronisation procedures when a previous SACCH data block was lost. Idle frames can be allowed to be used for SACCH performance enhancements after a lost SACCH frame even during pre-synchronisation in order to guarantee that at least every other SACCH frame can be correctly decoded. Each lost SACCH frame can, e.g., result in allowing a decoding of the second SACCH channel for several SACCH messages. Eventually however, sufficient time for neighbour cell synchronisation too must be allowed.

In the uplink, a mobile station used as a first, transmitting radio terminal preferably sends the parallel SACCH on the idle frame whenever no pre-synchronisation is required. The involved base station constituting a second, receiving radio terminal would then use this additional information whenever it is received, i.e. whenever the mobile has managed to send it. Alternatively, the base station can send a command to the mobile station to request the transmission of an additional SACCH via the idle frame when at least one SACCH message has already been lost. Here, even if used with AMR, the employment of a second SACCH does not depend on the AMR mode used but directly on the performance of the original SACCH. This implies, however, a specific signalling for the command.

For FACCHs, it is known to steal speech or data frames of 20 ms for transmitting a signalling message when needed. In order to increase the coding of the signalling messages, it is proposed to steal two speech or data frames of 20 ms for sending two FACCH, the second one conveying the same information as the first one. Advantageously but not necessarily, the two stolen frames are consecutive frames, which is better for the speech quality and for a reduced FACCH delay.

The solution proposed for FACCHs requires a stealing of 40 ms of speech or data frames instead of 20 ms. But FACCH signalling messages are a relatively rare phenomenon and their effect on overall speech quality is not very important. Consequently, also with stealing 40 ms, the speech quality should not be degraded.

In a preferred embodiment of the proposed method and the proposed radio terminal based on a change of the coding rate used for a single signalling message, the coding can be twice as high as in known transmissions: While a high coding rate is used for the coding of data or speech, the coding rate used for the coding of the signalling messages is high, in particular equal to the coding rate used in the state of the art. While a low coding rate is used for the coding of data or speech, in contrast, the signalling messages are coded with a coding rate twice lower. Additionally, it is preferred for FACCH signalling messages that a diagonal interleaving, other than block or rectangular, over 12 bursts is used for inserting the coded signalling message into the FACCH.

The proposed methods, radio terminals and modules are particularly suited for an employment with AMR. The transmission of signalling messages with an increased coding can be restricted to low AMR transmission, in case of FACCH to lowest AMR transmission. Such a restriction does not decrease the performance of the transmission of signalling messages, since higher AMR is only used with transmission paths of higher quality, in which few signalling messages are lost or not usable anyhow. In addition, the employment of the proposals of the invention can be restricted to the full rate mode, since the mentioned problem with the system performance occurs mainly in the full rate mode. The reason for this is that in the half rate mode, the same coding as in the full rate mode is used for SACCH and FACCH, while AMR speech channels are twice less encoded. The employment of the proposals of the invention does not have to be restricted to the full rate mode, though. For suited control channels, in particular for FACCHS, also an employment with a half rate mode and even a quarter rate mode is possible.

The invention can be used in particular in GERAN.

BRIEF DESCRIPTION OF THE FIGURES

In the following, the invention is explained in more detail with reference to drawings, of which

DETAILED DESCRIPTION OF THE INVENTION

Figure 1:
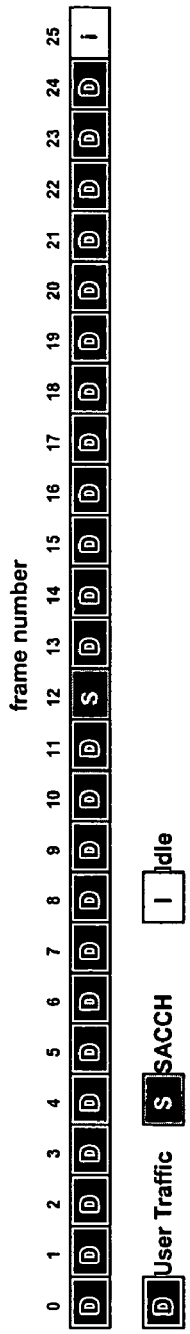
FIG. 1 shows a 26-multiframe used in full rate mode with one SACCH.

FIG. 1 shows an example of a 26-multiframe used in GSM/EDGE systems. Such multiframes can be used for transmitting user data like speech from a base station of a radio communications network to a mobile station and vice versa.

The 26-multiframe comprises 26 TDMA frames 0 to 25. Frames 0 to 11 and frames 13 to 24 are used to carry Traffic Channels TCH, indicated in FIG. 1 within the respective frames with a D, for speech. Frame 12 is used to carry a SACCH/T (Slow, TCH-Associated Control Channel), indicated in FIG. 1 within frame 12 with an S, for signalling messages that are to be transmitted during ongoing data traffic. TDMA frame 25 is a frame I with so called idle slots. This frame I is not used for transmission or reception. It rather gives the mobile station enough time to perform pre-synchronisation, for which the mobile station looks for the signalling channel SCH bursts of cells neighbouring the cell to which the base station belongs. Once the mobile station has finished the pre-synchronisation with all neighbouring cells, the spare time provided by the idle slots is no longer necessary.

Figure 2:
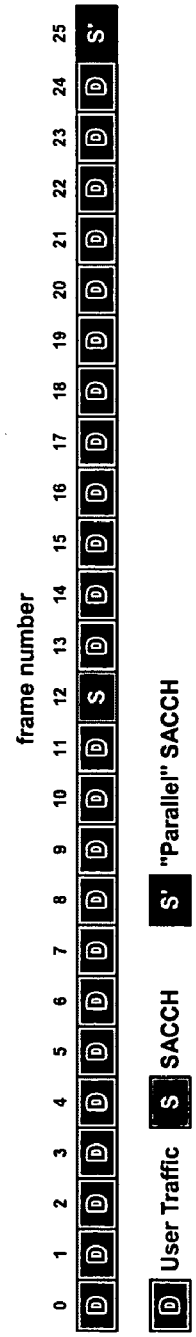
FIG. 2 shows a 26-multiframe used in full rate mode with two SACCHs according to the invention.

FIG. 2 shows a similar 26-multiframe which is used in an embodiment of the method according to the invention alternatively or in addition to the 26-multiframe of FIG. 1.

In FIG. 2, a SACCH and 24 TCHs are distributed to frames 0 to 24 of the 26-multiframe in the same way as to frames 0 to 24 of the 26-multiframe of FIG. 1. In addition, however, the same signalling message included in the SACCH in frame 12 is transmitted in a second SACCH using frame 25, which provided the idle slots in the multiframe of FIG. 1. The second SACCH is indicated in FIG. 2 with an S' within frame 25 instead of the I in FIG. 1. The signalling message is mapped on the idle slot corresponding to the timeslot used for the traffic channels to which the control channels are associated. The signalling message included in the second SACCH is coded differently by using a different polynomial than the one used for the coding of the same message included in the first SACCH using frame 12.

In the downlink, the base station always sends a parallel SACCH in frame 25 as shown in FIG. 2, and the mobile station uses this parallel SACCH in addition to the existing SACCH whenever no pre-synchronisation is needed. During pre-synchronisation, the contents of frame 25 are usually simply ignored, the multiframe leaving therefore just as much time for the pre-synchronisation procedures as the known 26-multiframes.

In addition, however, the network indicates via the base station, whether the mobile station may defer the ongoing pre-synchronisation operations in case the SACCH performance needs to be improved. As a result, the mobile station can use both SACCHs whenever needed also during pre-synchronisation.

In the uplink, the mobile station sends in frame 25 idle slots as indicated in FIG. 1 during pre-synchronisation operations and a parallel SACCH as shown in FIG. 2 whenever no pre-synchronisation is required. The base station uses the additional information whenever it is received.

The second signalling message can be used in the receiving radio terminal, mobile station or base station, by soft combining. This means that the soft output bits which contain the first signalling message are combined with the soft output bits containing the second signalling message. Actually, this allows use of the same coding for both SACCHs transmitted or to use different codings in order to improve the performance when the information is decoded.

Figure 2A:
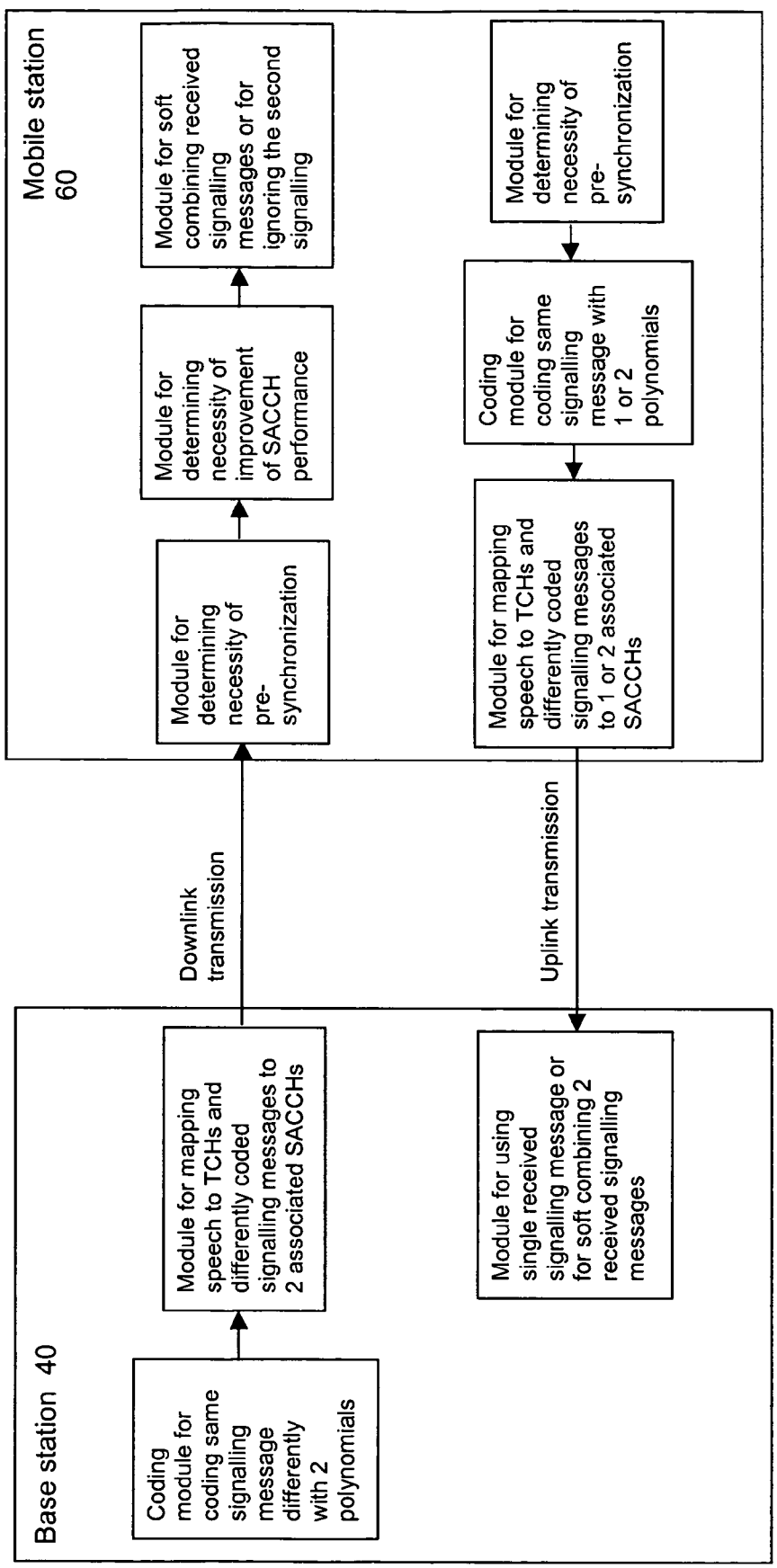
Fig. 2a is a block diagram of a radio communications system according to the present invention with two radio terminals (a mobile station and a base station)

FIG. 2a is an overall block diagram of a radio communications system with two radio terminals. In particular, a base station 40 and a mobile station 60 are shown with associated modules for implementing the present invention so as to achieve improvement in the quality of control signalling based upon signalling messages controlling speech or data transmission over an air interface between the at least two radio terminals 40 and 60.

Figure 2B:
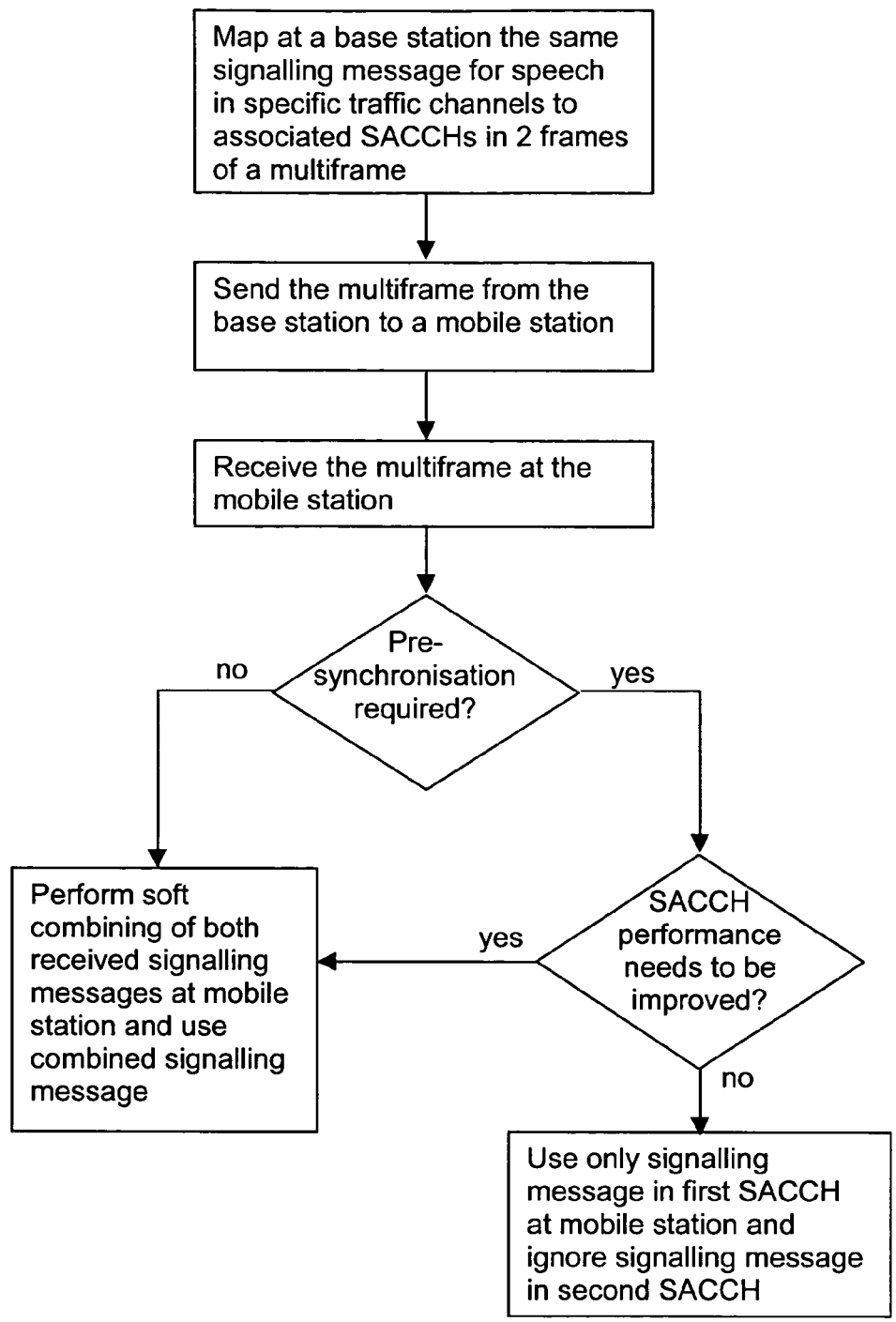
FIG. 2b is a flow chart in the downlink direction for implementing a method for improving the quality of control signalling based on signalling messages, according to the present invention.

FIG. 2b is a flow chart showing the steps in the downlink direction for achieving such improvement in the quality of control signalling, wherein a first signalling message with content is transmitted in a first control channel, and wherein a second signalling message with identical content to the first signalling message is transmitted in a second control channel that is separate from the first control channel.

Figure 2C:
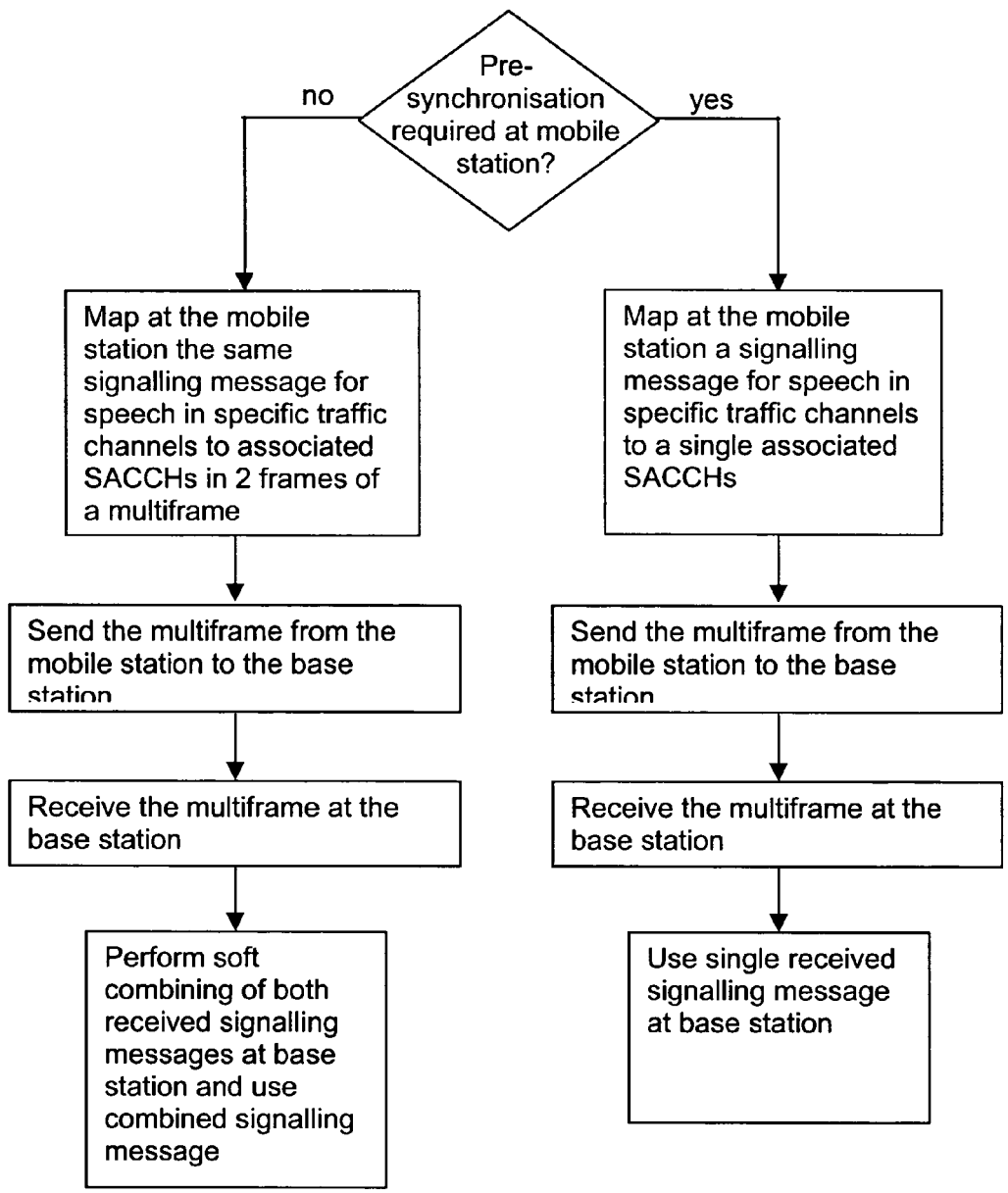
FIG. 2c is a flow chart similar to FIG. 2b, showing the method in an uplink direction.

FIG. 2c is a flow chart showing the steps in the uplink direction for achieving such improvement in the quality of control signalling, wherein a first signalling message with content is transmitted in a first control channel, and wherein a second signalling message with identical content to the first signalling message is transmitted in a second control channel that is separate from the first control channel.

Figure 3:
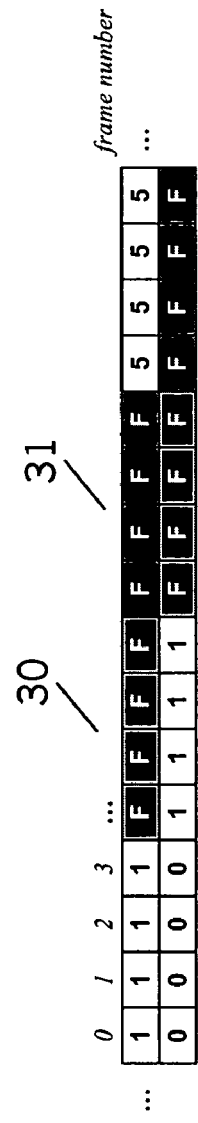
FIG. 3 shows two rows with consecutive multiframes used in full rate mode with two FACCHs according to the invention.

FIG. 3 shows frames used for full rate transmission of user data like speech from a base station of a radio communications network to a mobile station and vice versa.

16 frames 0, 1, 2, 3, etc. forming parts of two consecutive multiframes are depicted in two rows, the first one shown above the second one. Usually, both rows contain only the speech frames that are to be transmitted in full rate mode. In the situation in FIG. 3, however, in both rows, a coded signalling message is inserted in a first FACCH 30, 30' and the same coded signalling message is additionally inserted in a second FACCH 31, 31', each of the frames used for the FACCHs being indicated with an F. For the two FACCHs 30, 30', 31, 31', in each row consecutive speech frames of 20 ms were stolen. The remaining frames are further on used for speech, indicated within the frames with "0"s, "1"s and "5"s. The FACCHs 30, 30', 31, 31' are distributed diagonally interleaved as known for single FACCHs.

Whenever the lowest AMR modes are used and a handover message is sent, two consecutive FACCH 30, 30', 31, 31' are transmitted carried in frames stolen as shown in FIG. 3. Since the second FACCH 31, 31' contains a copy of the message in the first FACCH 30, 30', the receiving station can first try to decode the first FACCH 30, 30'. If it fails and a further FACCH 31, 31' is present, the receiving station can then try to decode the second FACCH 31, 31' separately or using soft combining, in particular if also a separate decoding of the second FACCH 31, 31' was not successful. When a higher AMR mode is used, only one FACCH 30, 30' is transmitted as known from the state of the art, since the risk of loosing it is not too high.

The invention claimed is:

1. A method for improving the quality of control signalling based on signalling messages controlling speech or data transmission over an air interface between a first radio terminal and a second radio terminal of a radio communications system, comprising:

transmitting said speech or data in at least one traffic channel of said radio communications system, transmitting a first signalling message with content in a first control channel associated with said at least one traffic channel between said first radio terminal and said second radio terminal, wherein said first radio terminal is a mobile station and said second radio terminal is a base station, or wherein said first radio terminal is a base station and said second radio terminal is a mobile station, and transmitting a second signalling message with identical content to the first signalling message in a second control channel associated with said at least one traffic channel between said first radio terminal and said second radio terminal, wherein the second control channel is separate from the first control channel, and
wherein the second signalling message is always transmitted if the first signalling message is transmitted.

2. A method according to claim 1, wherein the first and the second signalling message are coded differently for different control channels.

3. A method according to claim 1, wherein the first and the second signalling message are coded identically for different control channels.

4. A method according to claim 1, wherein the control channels are Slow Associated Control Channels in a Time Division Multiple Access radio communications system.

5. A method according to claim 4, wherein 26-multiframes including 26 time division multiple access frames are used to carry at least one Traffic Channel in the first 12 frames and in the $14^{th}$ to $25^{th}$ frames, and wherein a part of the first signalling message is inserted into a Slow Associated Control Channel carried in the $13^{th}$ frame and a corresponding part of the second signalling message is inserted into a Slow Associated Control Channel carried in the $26^{th}$ frame.

6. A method according to claim 4, wherein 26-multiframes including 26 time division multiple access frames are used to carry at least one Traffic Channel in the first 12 frames and in the $14^{th}$ to $25^{th}$ frames, and wherein a part of the first signalling message is inserted into a Slow Associated Control Channel carried in the $26^{th}$ frame and a corresponding part of the second signalling message is inserted into a Slow Associated Control Channel carried in the $13^{th}$ frame of the following 26-multiframe.

7. A method according to claim 4, wherein in a downlink data transmission, the signalling messages are transmitted from a base station used as the first radio terminal to a mobile station used as the second radio terminal, and wherein the second signalling message is always transmitted but only used after pre-synchronisation of the mobile station with cells neighbouring the cell to which the base station belongs, that is, when no other tasks are necessary during the frames with the second signalling message.

8. A method according to claim 7, wherein the second signalling message is used in addition during pre-synchronisation, if allowed by the base station and when required for signalling performance.

9. A method according to claim 7, wherein the second signalling message is used in addition during pre-synchronisation, when a previous Slow Associated Control Channel message was lost.

10. A method according to claim 4, wherein in uplink data transmission, the signalling messages are transmitted from a mobile station used as the first radio terminal to a base station used as the second radio terminal, and wherein the second signalling message is always transmitted when no pre-synchronisation of the mobile station with cells which are neighbouring the cell of the base station takes place.

11. A method according to claim 4, wherein in uplink data transmission, the signalling messages are transmitted from a mobile station used as the first radio terminal to a base station used as the second radio terminal, and wherein the second signalling message is only transmitted after request by the base station.

12. A method according to claim 1, wherein the control channels are Fast Associated Control Channels in a Time Division Multiple Access radio communications system.

13. A method according to claim 12, wherein frames for two consecutive Fast Associated Control Channels are stolen from the at least one speech or data Traffic Channel for transmitting the first and the second signalling message.

14. A method according to claim 12, wherein the first and the second signalling messages are transmitted whenever a new signalling message is needed.

15. A method according to claim 1, wherein the first and the second signalling messages are evaluated in a receiving radio terminal by soft combining of the two signalling messages.

16. A method according to claim 1, used for Adaptive Multirate transmissions.

17. A method according to claim 16, used only for low Adaptive Multirate transmissions.

18. A method according to claim 1, used only for full rate mode transmissions.

19. A radio terminal for a radio communications system for improving the quality of control signalling based on signalling messages controlling speech or data transmission over an air interface to one other radio terminal of the radio communications system, said speech or data being transmitted in at least one traffic channel of said radio communications system, and said signalling messages being transmitted in control channels associated with said at least one traffic channel, comprising:
a mapping module for inserting a first signalling message with content into a first control channel for transmission to said one other radio terminal, and
a coding module for coding said first signalling message, wherein said mapping module is configured for inserting a second signalling message with identical content to the first signalling message into a second control channel for transmission to said one other radio terminal, wherein the second control channel is separate from the first control channel,
wherein said mapping module is configured to always insert said second signalling message if said first signalling message is inserted to said first control channel, and
wherein the radio terminal is a mobile station and the one other radio terminal is a base station, or wherein the radio terminal is a base station and the one other radio terminal is a mobile station.

20. A radio terminal according to claim 19, further including a coding module for coding the signalling messages that are to be inserted into two different control channels differently for said two different control channels.

21. A radio terminal according to claim 19, wherein said control channels are Slow Associated Control Channels in a Time Division Multiple Access radio communications system, and wherein the mapping module is suited to insert only one signalling message into one Slow Associated Control Channel during a pre-synchronisation of the radio terminal with the cells neighbouring the cells of the other radio terminal and to insert two signalling messages with identical content into two different Slow Associated Control Channels whenever no pre-synchronisation takes place, that is, when no other tasks are necessary during the frames to be used for the second signalling message.

22. A radio terminal according to claim 19, wherein said control channels are Slow Associated Control Channels in a Time Division Multiple Access radio communications system, further including a receiving module for receiving a signal indicating that a second signalling message in a Slow Associated Control Channel is needed and for controlling the insertion of the second signalling message into a second Slow Associated Control Channel accordingly.

23. A radio terminal according to claim 19, wherein said control channels are Slow Associated Control Channels in a Time Division Multiple Access radio communications system, and wherein the mapping module is suited to insert data or speech into Traffic Channels carried in the $1^{St}$ to $12^{th}$ frame of 26-multiframes including 26 time division multiple access frames, further data or speech into Traffic Channels carried in the $14^{th}$ to $25^{th}$ frame of the 26-multiframes, a part of a first signalling message into a first Slow Associated Control Channel carried in the $13^{th}$ frame of the 26-multiframes, and a corresponding part of a second signalling message into a second Slow Associated Control Channel carried in the $26^{th}$ frame of the 26-multiframes.

24. A radio terminal according to claim 19, wherein said control channels are Slow Associated Control Channels in a Time Division Multiple Access radio communications system, and wherein the mapping module is suited to insert data or speech into Traffic Channels carried in the $1^{st}$ to $12^{th}$ frame of 26-multiframes including 26 time division multiple access frames, further data or speech into Traffic Channels carried in the $14^{th}$ to $25^{th}$ frame of the 26-multiframes, a part of a first signalling message into a first Slow Associated Control Channel carried in the $26^{th}$ frame of the 26-multiframes, and a corresponding part of a second signalling message into a second Slow Associated Control Channel carried in the $13^{th}$ frame of the respective following 26-multiframe.

25. A radio terminal according to claim 19, wherein said control channels are Fast Associated Control Channels in a Time Division Multiple Access radio communications system, further including a receiving module for receiving a signal indicating that signalling messages in Fast Associated Control Channels are needed and for controlling a stealing of frames of 40 ms of the Traffic Channels for two Fast Associated Control Channels, into which the signalling messages are to be inserted, accordingly.

26. A radio terminal for a radio communications system for improving the quality of control signalling based on signalling messages controlling speech or data transmission over an air interface from one other radio terminal of the radio communications system, said speech or data being transmitted in at least one traffic channel of said radio communications system, and said signalling messages being transmitted in control channels associated with said at least one traffic channel, comprising:
  a receiving module for receiving a first signalling message with content on a first control channel and a second signalling message with identical content on a second control channel separate from the first control channel from said one other radio terminal, and
  an evaluation module for evaluating said first and second signalling messages,
  wherein said second signalling message is always received if said first signalling message is received, and
  wherein the radio terminal is a mobile station and the one other radio terminal is a base station, or wherein the radio terminal is a base station and the one other radio terminal is a mobile station.

27. A radio terminal according to claim 26, further including a pre-synchronization module for determining if a pre-synchronisation with cells neighbouring the cell of the transmitting radio terminal is terminated, the evaluation module is configured for evaluating the second message only after terminated pre-synchronisation, that is, when no other tasks are necessary during the frames used for the second signalling message.

28. A radio terminal according to claim 26, further including a determination module for determining if a second signalling message is necessary for acceptable signalling performance, the evaluation module is configured for evaluating the second message if necessary for the signalling performance regardless of the termination of a pre-synchronisation of the radio terminal with the cells neighbouring the cell of the transmitting radio terminal.

29. A radio terminal according to claim 26, further including a determination module for determining, whether a second signalling message is needed and for requesting from the other radio terminal a second signalling message if one is needed.

30. A module for a radio terminal of a radio communications system for improving the quality of control signalling based on signalling messages controlling speech or data transmission over an air interface to one other radio terminal of the radio communications system, said speech or data being transmitted in at least one traffic channel of said radio communications system, and said signalling messages being transmitted in control channels associated with said at least one traffic channel to said one other radio terminal, comprising:
  a mapping module for inserting a first signalling message with content into a first control channel for transmission to said one other radio terminal, and
  a coding module for coding the first signalling message,
  wherein said mapping module is for inserting a second signalling message with identical content to the first signalling message into a second control channel for transmission to said one other radio terminal, wherein the second control channel is different from the first control channel,
  wherein said mapping module is configured to always insert said second signalling message if said first signalling message is inserted to said first control channel, and
  wherein said radio terminal is a mobile station and the one other radio terminal is a base station, or wherein the radio terminal is a base station and the one other radio terminal is a mobile station.

31. A module for a radio terminal of a radio communications system for improving the quality of control signalling based on signalling messages controlling speech or data transmission over an air interface from one other radio terminal of the radio communications system, said speech or data being transmitted in at least one traffic channel of said radio communications system, and said signalling messages being transmitted in control channels associated with said at least one traffic channel from said one other radio terminal, comprising:
  an evaluation module for evaluating a first signalling message having content received from said one other radio terminal in a first control channel; and
  a receiving module for receiving said first signalling message,
  wherein said evaluation module is for evaluating a second signalling message received from said one other radio terminal in a second control channel, wherein the second signalling message has content that is identical to the content of the first signalling message,
  wherein the second control channel is separate from the first control channel,
  wherein said evaluation module is configured to always evaluate said second signalling message if evaluating said first signalling message, and
  wherein said radio terminal is a mobile station and the one other radio terminal is a base station, or wherein the radio terminal is a base station and the one other radio terminal is a mobile station.

32. A method for improving the quality of control signalling based on signalling messages controlling speech or data transmission over an air interface between a first radio terminal and a second radio terminal of a radio communications system, comprising:

receiving a first signalling message with content in a first control channel associated with at least one traffic channel between said first radio terminal and said second radio terminal, wherein said first radio terminal is a mobile station and said second radio terminal is a base station, or wherein said first radio terminal is a base station and said second radio terminal is a mobile station, receiving a second signalling message with identical content to the first signalling message in a second control channel associated with said at least one traffic channel between said first radio terminal and said second radio terminal, wherein the second control channel is separate from the first control channel, wherein said second signalling message is always received if said first signalling message is received.

33. A method according to claim 32, wherein the first and the second signalling message are coded identically for different control channels.

34. A method according to claim 32, wherein the control channels are Slow Associated Control Channels in a Time Division Multiple Access radio communications system.

35. A method according to claim 32, wherein the control channels are Fast Associated Control Channels in a Time Division Multiple Access radio communications system.

36. A method according to claim 32, further comprising evaluating the first and the second signalling messages by soft combining of the two signalling messages.

37. A method according to claim 32, used only for full rate mode transmissions.

* * * * *